United States Patent [19]
Nishiyama

[11] Patent Number: 4,633,721
[45] Date of Patent: Jan. 6, 1987

[54] LOAD CELL HAVING A THIN FILM STRAIN-INDUCIBLE ELEMENT

[75] Inventor: Yoshihisa Nishiyama, Shizuoka, Japan

[73] Assignee: Tokyo Electric Co., Ltd., Tokyo, Japan

[21] Appl. No.: 729,362

[22] Filed: May 1, 1985

[30] Foreign Application Priority Data

| May 17, 1984 [JP] | Japan | 59-99288 |
| May 17, 1984 [JP] | Japan | 59-99289 |
| May 18, 1984 [JP] | Japan | 59-99782 |
| May 18, 1984 [JP] | Japan | 59-99783 |

[51] Int. Cl.$^4$ ............................................. G01L 1/22
[52] U.S. Cl. .................................. 73/862.67; 73/776; 73/862.65; 338/2
[58] Field of Search ............ 73/765, 766, 776, 862.63, 73/862.65, 862.67; 338/2, 3, 5

[56] References Cited

U.S. PATENT DOCUMENTS

| 4,299,130 | 11/1981 | Koneval ................................ 73/766 |
| 4,329,878 | 5/1982 | Utner et al. . |
| 4,432,247 | 2/1984 | Takeno et al. . |
| 4,462,018 | 7/1984 | Yang et al. ............................. 338/3 |

FOREIGN PATENT DOCUMENTS

0120139 7/1983 Japan ..................................... 338/2

Primary Examiner—Charles A. Ruehl
Attorney, Agent, or Firm—Oblon, Fisher, Spivak, McClelland & Maier

[57] ABSTRACT

A load cell wherein strain gauges are produced by a thin film process on a pattern forming surface of a strain-inducible element in such a manner that the resistances of the strain gauges are varied in accordance with deformations caused in thin portions of the strain-inducible element, and adjustable resistors are deposited by the thin film process for an electric circuit assembly including a differential amplifier, a potential divider, a signal amplifier and a zero-point setter. And each of the resistors is adjusted by trimming simultaneously with trimming adjustment of the strain gauges.

6 Claims, 4 Drawing Figures

LOAD CELL HAVING A THIN FILM STRAIN-INDUCIBLE ELEMENT

BACKGROUND OF THE INVENTION

FIELD OF THE INVENTION

The present invention relates to a load cell designed for measuring a load by the use of strain gauges which detect, in the form of an electric signal, deformations caused by the load in thin portions of a strain-inducible element.

DISCUSSION OF BACKGROUND

In the conventional load cell utilizing the effect of strain gauges, it is customary that two strain gauges are attached to each of upper and lower surfaces of a strain-inducible element respectively. However, since such a structure requires a considerably great amount of labor in manufacture with another disadvantage of intricate electrical connection, an improved technique is currently carried out as disclosed in U.S. Pat. No. 4,432,247, in which strain gauges are provided by a thin film process on one side of a strain-inducible element serving as a pattern forming surface.

One exemplary means for adjusting the resistance of each strain gauge is based on trimming thereof with a laser beam, as disclosed in Japanese Patent Application No. 144,502/1980.

SUMMARY OF THE INVENTION

A first object of the present invention resides in simplifying adjustment of the resistance of each strain gauge as well as that of an adjustable resistor incorporated in an electric circuit assembly.

A second object of the invention is to achieve facilitated deposition of various adjustable resistors by a thin film process simultaneously with production of strain gauges.

Other objects and advantages of the invention will be apparent from the following description.

DETAIL DESCRIPTION OF THE PREFERRED EMBODIMENT

Figure 1:
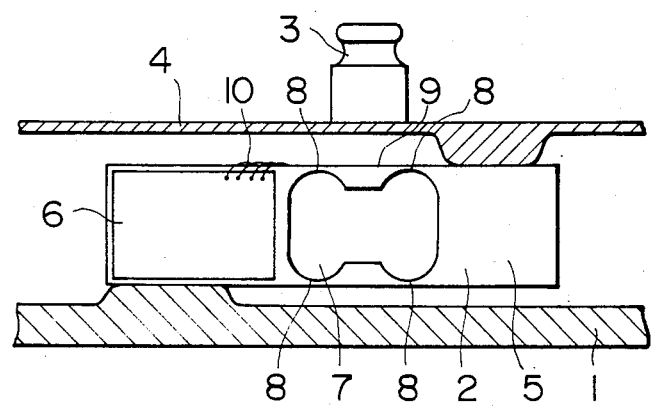
FIG. 1 is a vertical sectional view of a region where a strain-inducible element is attached.

A lower portion of a load cell member 2 at one end thereof is anchored on a base 1 so constructed as to have a sufficient mechanical strength, and a mount tray 4 for supporting a load 3 thereon is secured to an upper portion of the load cell member 2 at the other end thereof. The load cell member 2 comprises a strain-inducible element 5 composed of stainless steel or the like, and an electronic circuit assembly 6 attached to one side of the element 5. The strain-inducible element 5 has a recess 7 to form four thin portions 8 which are deformable in the shape of a parallelogram. The top of the strain-inducible element 5 serves as a pattern forming surface 9, where later discussed circuit components deposited by the thin film process are connected respectively to associated portions on the electronic circuit assembly 6 by means of leadwires 10.

Figure 4:
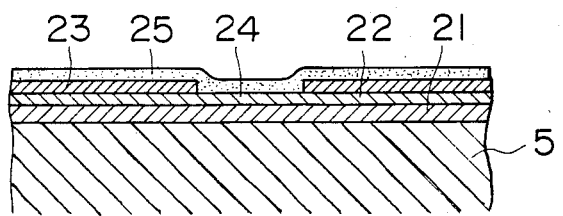
FIG. 4 is an enlarged sectional view partially showing the structure of a resistor layer and a conductor layer deposited by a thin film process.

On the pattern forming surface of the strain-inducible element 5, there is deposited an insulator layer 21 of polyimide resin, silicon dioxide or the like, and further a resistor layer 22 and a lead layer 23 are laminated thereon sequentially, as shown in FIG. 4. The lead layer 23 is partially removed by the art of etching to form resistor regions 24 which function as strain gauges and adjustable resistors to be later discussed; i.e. the portion with such lead layer 23 serves as an electrical conductor or leadwire, while any other portion without the lead layer 23 serves as a resistor region 24 for energizing the resistor layer 22 therethrough.

The surfaces of such layers are covered with a protective layer 25.

In most cases the resistor layer 22 is constituted of two or three stratums which are composed of individual materials and are separated into portions for strain gauges and those for adjustable resistors.

Figure 2:
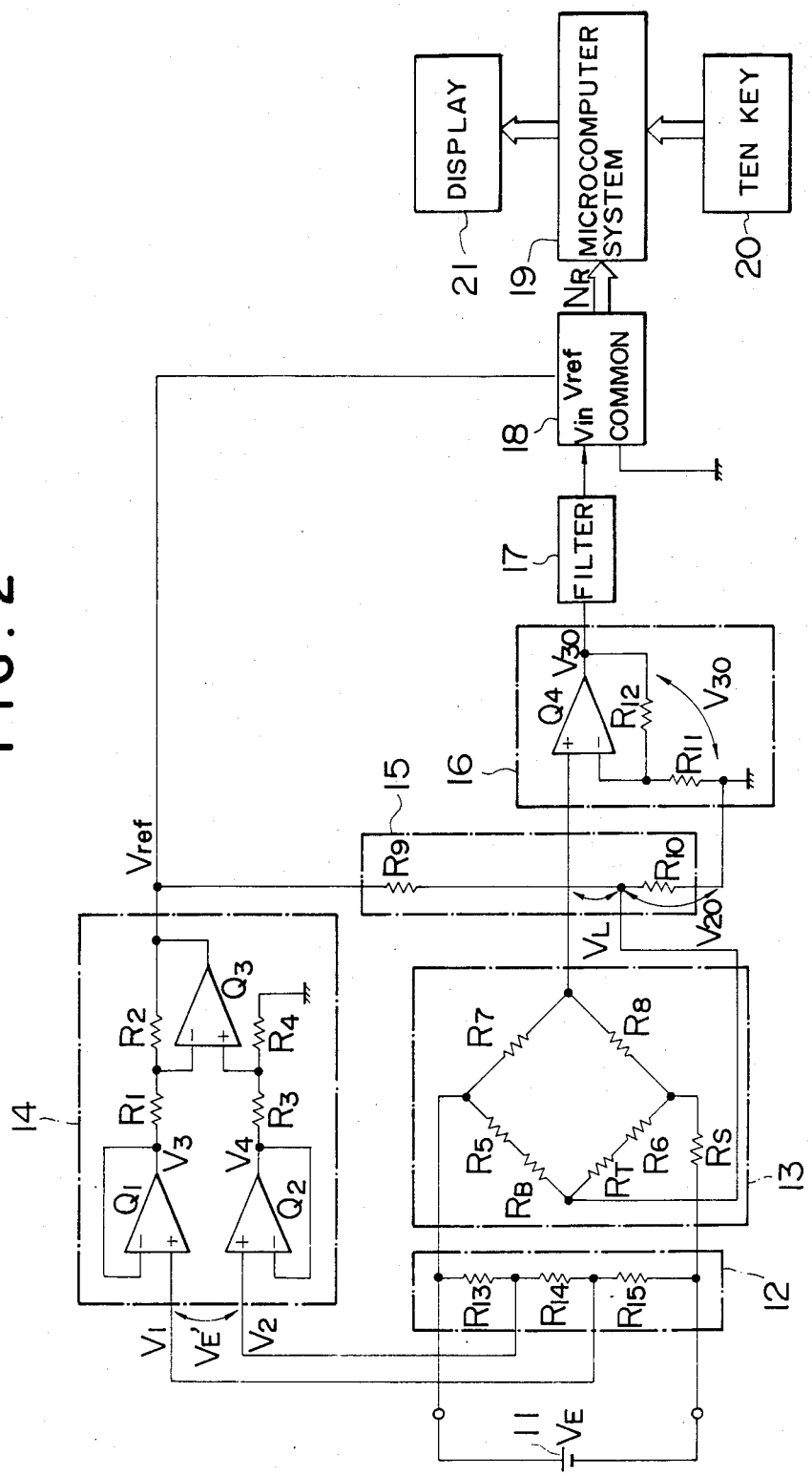
FIG. 2 is an electric circuit diagram.
Figure 3:
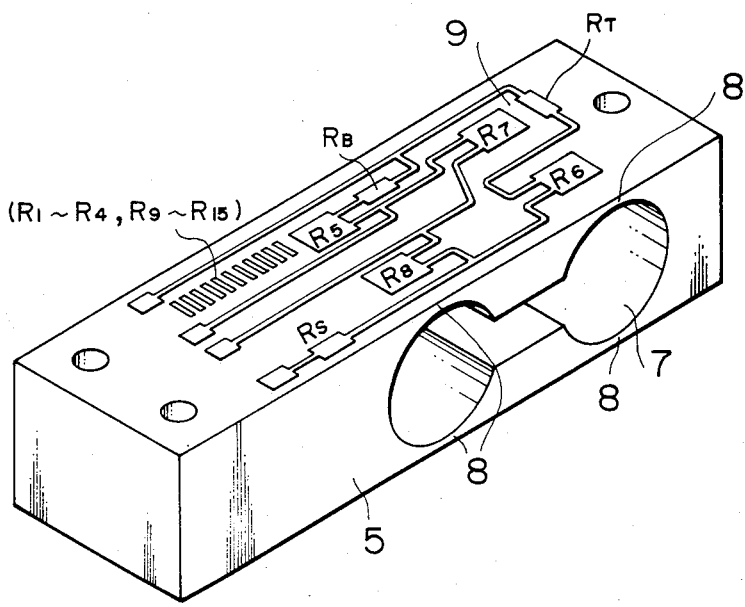
FIG. 3 is a perspective view of a pattern forming surface of the strain-inducible element.

Referring now to the electric circuit assembly shown in FIG. 2, a power supply 11 of a voltage $V_E$ is connected to a potential divider 12, which is connected to both a load cell circuit 13 and a differential amplifier 14. The circuit 13 and the amplifier 14 are connected via a zero-point setter 15 sequentially to a signal amplifier 16 and a filter 17. The filter 17 and the differential amplifier 14 are connected to an A/D converter 18, which is further connected to a microcomputer system 19 provided separately, and a ten-key unit 20 is connected to the microcomputer system 19 whose output is connected to a display 21.

The potential divider 12 comprises resistors R13, R14 and R15 connected in series with one another.

The load cell circuit 13 connected to the power supply 11 via an adjustable resistor $R_S$ has a bridge network configuration which consists of four arms including a series path of R5 and $R_B$, a series path of R6 and $R_T$, R7 and R8.

In the differential amplifier 14, resistors R1, R2 and R3, R4 are connected respectively to outputs of comparators Q1 and Q2, while the junction of R1 and R2 and the junction of R3 and R4 are connected respectively to two inputs of another comparator Q3 whose output is connected to the output side of R2 with one end of R4 being grounded. A voltage V1 at the junction of R14 and R15 in the potential divider 12 is applied to an input of the comparator Q1, while a voltage V2 at the junction of R13 and R14 in the potential divider 12 is applied to an input of the comparator Q2. Accordingly the comparators Q1 and Q2 are fed with an input voltage $V_E'$ and produce output voltages V3 and V4 respectively, and thus the differential amplifier 14 produces an output voltage Vref.

The zero-point setter 15 comprises a series circuit of resistors R9 and R10, in which R9 is connected to the output terminal of the differential amplifier 14 while R10 is grounded. One output of the load cell circuit 13 is connected to the junction of the resistors R9 and R10, while another output thereof is connected to a positive input terminal of a comparator Q4 in the aforesaid signal amplifier 16. The resistor R10 produces a terminal voltage V20, and the load cell circuit 13 produces an output voltage $V_L$.

A resistor R11 is connected between the ground and one input terminal of the comparator Q4 in the signal amplifier 16, and another resistor R12 is connected between the above one input terminal and the output terminal of the comparator Q4. The signal amplifier 16 produces an output voltage V30.

The filter 17 is connected to a terminal $V_{IN}$ of the A/D converter 18, while the differential amplifier 14 is connected to a terminal Vref with a terminal COMMON being grounded.

The above-mentioned resistors R5, R6, R7 and R8 are positioned on the aforesaid thin deformable portions 8 to constitute strain gauges on the pattern forming surface 9, while the remaining resistors R1, R2, R3, R4, R9, R10, R11, R12, R13, R14, R15, $R_S$, $R_B$ and $R_T$ are disposed on the other portions of the pattern forming surface 9 which are not deformable by the load.

Describing the structure in further detail, an insulator layer is deposited on the pattern forming surface 9 of the strain-inducible element 5, and a metal layer having satisfactory temperature characteristic is deposited by the art of evaporation on the insulator layer and then is treated by suitable means such as photoetching to form a predetermined metal pattern corresponding to a required circuit configuration. Since the resistors are provided by the aforesaid thin film process, there exist great variations in the resistance values thereof. Particularly with regard to the resistors R5 through R8 in the bridge network, such variations bring about a problem. Therefore, the value of the resistor $R_B$ is adjusted for balancing the bridge network. For adjustment of the resistor $R_B$, it is generally customary to employ a laser trimmer.

An explanation will now be given first on the operation of the differential amplifier 14 performed in the constitution mentioned above. It is necessary for the differential amplifier 14 to produce a stable output Vref, which is given by Eq. (1) below.

$$Vref = \frac{R4}{R3 + R4} \cdot \frac{R1 + R2}{R1} \cdot (V2 + e) - \frac{R2}{R1} \cdot (V1 + e) \quad (1)$$

In Eq. (1), e is a noise voltage superposed on the signal voltages V1 and V2, and it needs to be zero in the output voltage Vref. Reduction of the noise voltage e is achievable by altering the in-phase rejection ratio of the resistors R1–R4, and such ratio alteration is executed simultaneously with the aforesaid trimming adjustment of the strain-gauge resistors R5–R8 effected by the use of a laser trimmer. Modifying Eq. (1), $$Vref = \frac{R4}{R1} \cdot \frac{1 + \frac{R2}{R1}}{\frac{R3}{R1} + \frac{R4}{R1}} \cdot (V2 + e) - \frac{R2}{R1} \cdot (V1 + e) \quad (2)$$

The adjustment is carried out for equalizing the individual ratios of R2–R4 with reference to R1 in such a manner as to obtain R2/R1=R3/R1=R4/R1=a.

Supposing now that $a \approx 1$, $$Vref = \frac{R2}{R1} \cdot (V2 - V1) = \frac{R2}{R1} \cdot V_{E}' \quad (3)$$

where the harmful influence of the noise voltage e is not existent.

Thus, the absolute resistance values of R1–R4 resulting from the thin film process raise no problem at all, and the requisite is mere adjustment of the ratios thereof. Since the remaining factor to be considered is the temperature characteristic alone, it becomes possible to achieve a high-precision circuit at low cost for the differential amplifier 14.

The output voltage $V_L$ of the load cell circuit 13 is proportional to a drive voltage $V_E$ applied thereto. With respect to the signal-to-noise ratio of the load cell circuit 13, a greater advantage is attainable as the drive voltage $V_E$ is higher. In this stage, the upper limit of the drive voltage $V_E$ is restricted by the bridge balance due to the thermal deformation of each bridge resistor heated by the power dissipated therethrough. Since the resistors R5–R8 in this exemplary embodiment are deposited by the thin film process, each of them can be formed to have a sufficient resistance value far greater than that of the resistor in the conventional strain gauge of attachment type.

In the meanwhile, when the input voltage to the comparators Q1, Q2 and Q3 of the differential amplifier 14 is in excess of the source voltage, the differential amplifier 14 is rendered inoperable. In order to avoid such a trouble, a voltage $V_{E}'$ is provided by the potential divider 12 to be applied as an input signal.

$$V_{E}' = \frac{R14}{R13 + R14 + R15} \cdot V_E \quad (4)$$

The voltage $V_{E}'$ is established at a proper value by adjusting the resistor R14. Since the resistor R14 is deposited by the thin film process on the same pattern forming surface 9 where the strain-gauge resistors R5–R8 are existent, it is adjustable simultaneously with trimming adjustment of the load cell circuit 13 executed by a laser trimmer.

The signal amplifier 16 serves to amplify the output signal $V_L$ of the load cell circuit 13. Its gain G is expressed as $$G = 1 + \frac{R12}{R11} \quad (5)$$

As the resistors R11 and R12 are deposited by the thin film process, it is necessary to adjust the ratio thereof to a predetermined value.

Furthermore, the sensitivity K of the load cell circuit 13 has an individual variation so that, even when the ratio R12/R11 is maintained constant, there still occurs a variation in the output voltage V30 of the signal amplifier with respect to the same load. The output voltage V30 is alterable to a predetermined value by adjusting the gain G in accordance with the sensitivity K of the load cell circuit 13.

Since the resistors R11 and R12 are deposited on the pattern forming surface 9 by the thin film process in the same manner as the strain-gauge resistors R5–R8, the resistors R11 and R12 are adjusted by the same laser trimmer at the time of trimming adjustment of the load cell circuit 13.

The zero-point setter 15 is provided for establishing the output voltage V30 of the signal amplifier 16 at a predetermined value when the load applied to the load cell circuit 13 is at its initial value. The output voltage V20 of the zero-point setter 15 is given by $$V20 = Vref \cdot \frac{R10}{R9 + R10} \quad (6)$$

From the above, the output voltage V30 of the signal amplifier 16 is expressed as $$V30 = (V_L + V20) \cdot G \qquad (7)$$

Consequently, the output voltage V30 is alterable to a predetermined value by adjustment of the voltage V20 which can be achieved by trimming the resistors R9 and R10. These resistors can be adjusted by the same laser trimmer simultaneously with adjustment of the strain-gauge resistors R5–R8.

What is claimed is:

1. A load cell comprising:
   a strain-inducible element having four thin portions deformable in the shape of a parallogram and having a pattern forming surface;
   A plurality of thin film deposited strain gauges formed on said pattern forming surface wherein each of said gauges is positioned in correspondence with said thin portions and wherein said strain gauges are interconnected to constitute a bridge network;
   differential amplifier means including a thin film differential amplifier resistance means;
   power supply means;
   potential divider means whose input is connected to the output of said power supply means and wherein said potential divider means includes a potential divider resistor means wherein the output of said divider means is connected to the input of said differential amplifier means;
   signal amplifier means including a thin film gain determining resistor means wherein one output of said bridge network is connected to one input of said signal amplifier means;
   zero-point setting means including a thin film setting resistor means wherein said setting means is connected to the output of said differential amplifier means and to one output of said bridge network;
   wherein each of said differential amplifier means, said potential divider means, said signal amplifier means and said zero-point setting means is deposited on said pattern forming surface together with said strain gauges in such a manner so that at least one of said differential amplifier resistor means, said divider resistor means, said gain determining resistor means and said setting resistor means is adjustable by trimming simultaneously with trimming adjustment of said strain gauges.

2. The load cell according to claim 1 wherein said differential amplifier resistor means is adjusted by trimming simultaneously with trimming adjustment of said strain gauges.

3. The load cell according to claim 1 wherein said divider resistor means includes a plurality of resistors which are adjusted by trimming simultaneously with trimming adjustment of said strain gauges.

4. The load cell according to claim 1 wherein said gain determining resistor means includes at least one resistor which is adjusted by trimming simultaneously with trimming adjustment of said strain gauges.

5. The load cell according to claim 1 wherein said setting resistor means includes a resistor which is adjusted by trimming simultaneously with trimming adjustment of said strain gauges.

6. The load cell according to claim 1 wherein said differential amplifier resistor means, said divider resistor means, said gain determining resistor means, and said setting resistor means are all adjusted by trimming simultaneously with trimming adjustment of said strain gauges.

* * * * *